(12) United States Patent
Seabolt et al.

(10) Patent No.: US 9,579,561 B2
(45) Date of Patent: Feb. 28, 2017

(54) ALLOWING INTERACTIVE POST OF AN ONLINE GAME WITHIN A SOCIAL NETWORK

(71) Applicant: Zynga Inc., San Francisco, CA (US)

(72) Inventors: Alden Seabolt, Atherton, CA (US);
Russell L. Daigle, Sunnyvale, CA (US);
Jianlin Wang, Sunnyvale, CA (US);
Nathaniel Wise, Campbell, CA (US);
Di Wu, Ontario (CA)

(73) Assignee: Zynga Inc., San Francisco, CA (US)

( * ) Notice: Subject to any disclaimer, the term of this patent is extended or adjusted under 35 U.S.C. 154(b) by 207 days.

(21) Appl. No.: 13/725,999

(22) Filed: Dec. 21, 2012

(65) Prior Publication Data

US 2014/0179412 A1 Jun. 26, 2014

(51) Int. Cl.
*A63F 13/48* (2014.01)
*A63F 13/30* (2014.01)
*A63F 13/40* (2014.01)
*A63F 13/795* (2014.01)

(52) U.S. Cl.
CPC .............. *A63F 13/12* (2013.01); *A63F 13/10* (2013.01); *A63F 13/48* (2014.09); *A63F 13/795* (2014.09); *A63F 2300/572* (2013.01)

(58) Field of Classification Search
CPC .......... A63F 13/10; A63F 13/12; A63F 13/48; A63F 13/795

USPC .............................................. 463/1–6, 40–42
See application file for complete search history.

(56) References Cited

U.S. PATENT DOCUMENTS

| 8,147,328 | B2* | 4/2012 | Carroll et al. | 463/29 |
| 8,287,341 | B1* | 10/2012 | Reynolds et al. | 463/9 |
| 8,480,494 | B2* | 7/2013 | Cantor | 463/40 |
| 8,668,590 | B2* | 3/2014 | Barclay et al. | 463/42 |
| 8,671,019 | B1* | 3/2014 | Barclay et al. | 705/14.41 |
| 2012/0122587 | A1* | 5/2012 | Kelly et al. | 463/42 |
| 2012/0209999 | A1* | 8/2012 | Chen-Quee et al. | 709/225 |
| 2013/0035158 | A1* | 2/2013 | Osvald et al. | 463/30 |

* cited by examiner

*Primary Examiner* — David L Lewis
*Assistant Examiner* — Ross Williams
(74) *Attorney, Agent, or Firm* — Martine Penilla Group, LLP

(57) ABSTRACT

Methods, systems, and computer programs for sharing a game play over a social network include executing a play session of a game. During execution of the play session, an option is provided to share a portion of the game on a social network. In response to receiving a request to share the portion of the game, an instance of the game is generated at a time when the request is received and is posted to a stream of the social network. The instance of the game inherits a current state of the play session. A reward is generated to a user account that plays the instance in the stream and to the user that initiates the sharing of the portion of the game upon the user playing the instance of the game claims the reward.

18 Claims, 12 Drawing Sheets

Jonathan Watson

Help me out Play my slot machine and get free chips for you and me

Win up to $1M FREE Chips Act now while there are still chips left

ALLOWING INTERACTIVE POST OF AN ONLINE GAME WITHIN A SOCIAL NETWORK

BACKGROUND

1. Field of the Invention

The present embodiments relate to online interactive game, and more particularly to, methods, systems, and computer programs for allowing interactive post of an online game within a social network.

2. Description of the Related Art

The popularity of games has extended to games played online with a plurality of users. Online games such as poker, slots, blackjack, etc., are played on a computer by a large number of users. However, most of the online games are played individually and are generally not shared with other users. In the online games that are played individually, the games are very similar to the real-life games, such as slot games, that have been around for a long time, and merely seem to copy the user interface provided by the real-life games.

Current popularity of interactive social network has made possible some level of collaboration amongst users while playing online games. Such collaborations include users assisting one another in completing missions, challenges, certain game levels, or for obtaining bonus points/prizes, etc. Such social interaction and collaboration in online games is appealing to many users that wish to share some of their gaming experience with other friends. However, the existing online games have limitations that restrict social interaction and collaboration. For instance, when a user receives an invitation, at the social network, to join the online game and to collaborate with other users, the user has to exit out of the social network and access the online game from the online gaming source.

It is in this context that embodiments arise.

SUMMARY

Various embodiments are presented for allowing interactive post of an online game within a social network. It should be appreciated that the present embodiments can be implemented in numerous ways, such as a method, an apparatus, a system, a device, or a computer program on a computer readable medium. Several embodiments are described below.

In one embodiment, a method for sharing game play over a social network is disclosed. The method includes executing a play session of a game. During execution of the play session, an option is provided to share a portion of the game on a social network. In response to receiving a request to share the portion of the game, an instance of the game is generated at a time when the request is received. The instance of the game inherits a current state of the play session. The request for sharing acts to post the instance of the game to a stream of the social network. A reward is generated to a user account of a user that plays the instance in the stream and to the user account of a user that initiates the request to share the portion of the game.

In another embodiment, a method for sharing game play over a social network is disclosed. The method includes detecting a posting of an instance of a game in a stream of the social network. The instance of the game provides a current state of a play session of a user sharing a portion of the game on the social network. In response to receiving a request to play the instance of the game in the stream, an expanded interactive component of the game is presented along with one or more controls for playing the game from within the stream of the social network. A reward is generated in response to game play to a user account of a user playing the instance of the game and to the user that shared the instance of the game in the stream of the social network.

In yet another embodiment, a non-transitory computer-readable storage medium embedding program instructions for sharing game play over a social network is disclosed. The computer readable storage medium includes program instructions for executing a play session of a game. The program instructions for executing a play session include program instructions for providing an option to share a portion of the game on a social network, during execution of the play session. The computer-readable storage medium further includes program instructions for receiving a request to share the portion of the game. In response to receiving a request, the program instruction is further configured to generate an instance of the game at a time when the request is received and post the instance of the game to a stream of the social network. The instance of the game inherits a current state of the play session. The computer-readable storage medium further includes program instruction for generating a reward to a user account that plays the instance in the stream and a reward to a user account that initiated the request to share the portion of the game.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 2a, 2b, 2c-1 and 2c-2 illustrate Graphical User Interface (GUI) representation of the online game used for managing rewards for the users (the user who shares an instance of the game and the user who plays the game), according to one embodiment.

DETAILED DESCRIPTION

Figure 1:
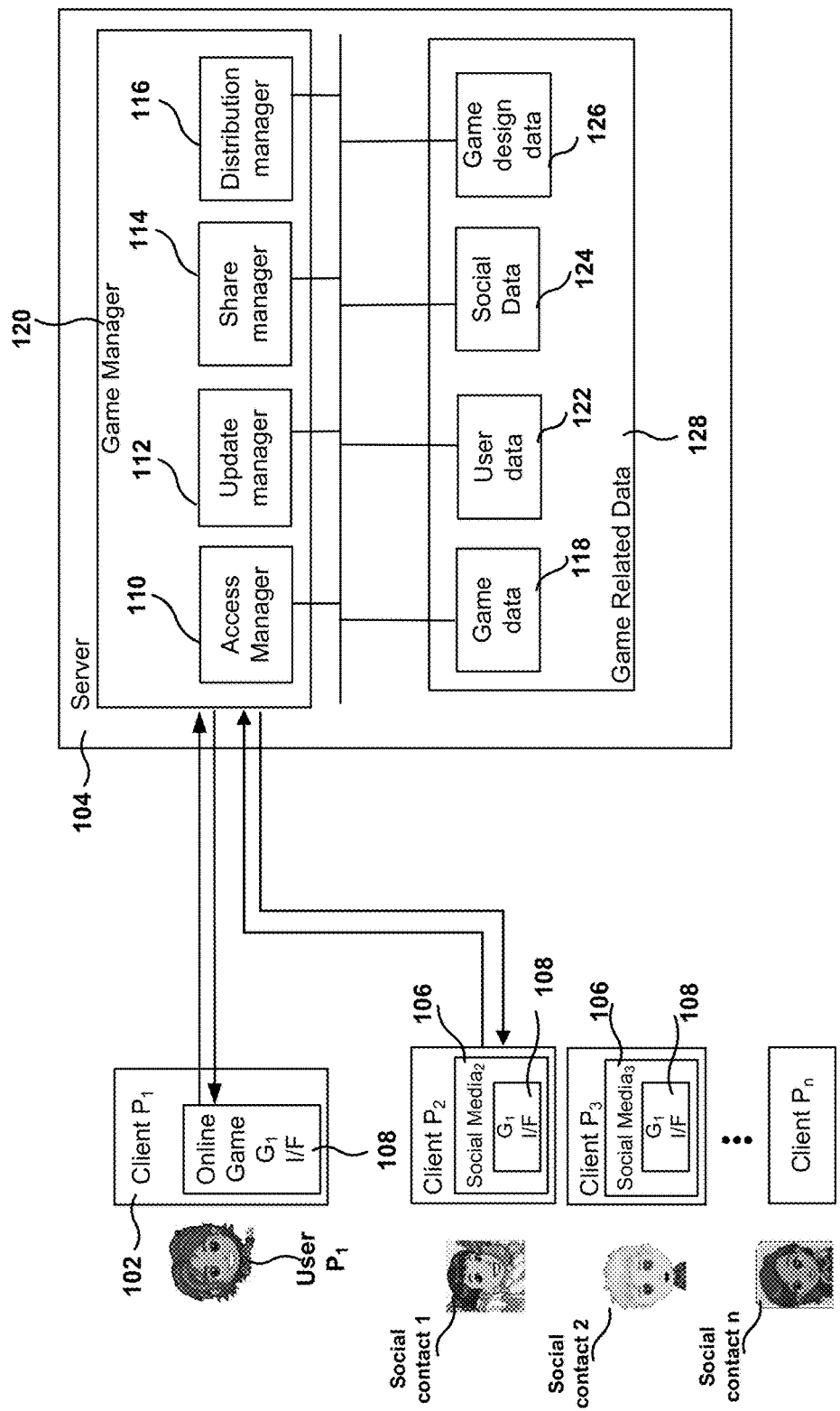
FIG. 1 illustrates a simplified block diagram of a system for allowing interactive post of an online game within a social network, according to one embodiment.

The following embodiments describe a method and apparatus for executing a game. It will be apparent, that the present embodiments may be practiced without some or all of these specific details. In other instances, well known process operations have not been described in detail in order not to unnecessarily obscure the present embodiments.

The embodiments provide a way for users to play the online game, share game state of the online game with one or more social contacts within one or more of their social groups using social network and to seek assistance from the one or more of their social contacts to achieve a desired target, perform a challenging task, to enhance their winnings or to overcome certain challenges in the online game. The game state and game controls to participate in the online game are provided within the social network to enable the social contacts to participate in the online game from within the social network and contribute to the winnings of the user. The game rewards obtained in the online game through the game play of the social contacts are shared between the user and the respective social contacts, thereby providing an incentive for the social contacts to participate in the online game.

The various embodiments discussed herein provide an interactive and collaborative online game that uses the social network as a collaboration site for enabling social contacts within the one or more social groups of the user to access and participate in the online game. The social contacts need not have to leave the confines of the social network in order to participate in the online game as the game state and the controls to access and participate are provided within a stream of the social network. With the general understanding of the invention, various embodiments for managing participation and distributing rewards in an online game will now be described with reference to the enclosed drawings.

As used herein, a "social contact" of a user refers to a person that has established a social link or social relationship with the user within a social network. The social contact may belong to one or more social groups within one or more social network of the user. For example, a social contact may be a friend, a relative, or a person that shares a common interest and/or that the user has met/interacted with in real-life or over the internet. In some embodiments, the social contact may be an acquaintance established through a social network, such as a friend of a friend of the user in the social network become friends of the user. It should be noted that two persons who may be friends in real-life may not be social contacts of one another if the two have not established an interrelationship online. Alternately, if two persons do not know each other in real life but have established interrelationship online, then these two persons will be social contacts of one another for all or some of the social interactions performed online.

It should also be noted that the various embodiments are described herein with reference to a slots online game, to provide an understanding. It should, however, be noted that the principles may be extended to other online games or applications that require or benefit from social collaboration described in the various embodiments. The embodiments described herein should therefore not be interpreted to be exclusive or limiting, but rather exemplary or illustrative.

FIG. 1 is an illustrative embodiment of a system used for allowing sharing of an online game within a social network. The system includes a server 104, such as a game server, executing the online game, according to one embodiment. The server 104 hosting the online game includes a game manager 120 having a plurality of modules, such as an access manager module 110, an update manager module 112, a share manager module 114, and a distribution manager module 116. The server 104 also includes game related data 128, such as game data 118, user data 122, social data 124 and game design data 126. A user $P_1$, in one embodiment, initiates access to the online game executing on the server utilizing a game interface 108 on a client device 102 executing a computer program, such as a web browser. In another embodiment, the client may execute other computer programs other than the web browser to interact with the game interface for transmitting command and data between the client and the various modules of the game manager executing on the server 104.

In one embodiment, the game manager 120 provides access to the online game and manages the game operations for each of the players. The various modules within the game manager are configured to interact with each other to perform the respective game operations of the online game. In addition, the various modules within the game manager access and manage game related data stored in the various databases during the execution of the online game. In one embodiment, the access manager 110 is configured to validate a user and provide access to the online game executing on the server 104. The access manager 110 provides the online game interface and data/information that is used to populate the various fields within, at the client 102. For instance, the access manager 110 provides the game state of the online game, which is a current view of the game, as well as any game rewards awarded to the user during game play. The game rewards, in one embodiment, may include points, prizes, incentives, tools, etc., in response to the user's participation or interest in the online game. The access manager 110 interacts with game data 118 and user data 122 to retrieve the information related to the online game and presents the game state and the game rewards at the client device 102 for the user. In addition, the access manager 110 provides one or more controls for accessing and participating in the online game. When the user accesses the game through the client, the access manager 110 synchronizes game operations with the client 102, manages communications with the client 102, etc.

Update manager 112 manages updates to the game state and game rewards at the game interface and in the respective databases, such as user data 122 and the game data 118, in response to the user interactions at the online game. In one embodiment, the update manager 112 includes game mechanics logic (not shown) to receive the interaction from a user, interpret the interaction and to compute game state and game awards based on the interpretation. For example, in an online game, such as a slot machine game, the game mechanics logic receives the user interaction, interprets the user interaction and performs game simulation to determine outcome of the game and computes possible game rewards won related to the user's interaction, such as spinning of the game. The game rewards won by the user are commensurate with the status of the online game based on the user's game play in the online game. For example, the slot game is a game of chance and the computation of game rewards to be awarded to the user is based on game rules and a degree of randomness related to the game of chance. The probability of each outcome of the online game is driven by data and logic set up by game designers. The game design data 126 stores the various logics associated with the online game and make it available to the update manager 112 and to distribution manager 116. The game design data 126 may, in one embodiment related to slot machine game, specify the various symbols provided in the online game, the combinations that result in generating game rewards, the odds of obtaining the combinations and winning game rewards, etc.

Additionally, the update manager 112 receives requests to share a portion of the game with one or more users on a social network. The request for sharing the game may be received through a share manager 114 and the share manager 114 may interact with the update manager 112 to provide an instance of the game in response to the request. The update manager 112, in response to the request for sharing, retrieves the game state at the time the request for sharing was received, possible game rewards and/or incentives from the respective databases and generates an instance of the game for sharing. The instance of the game, based on the information retrieved, includes the current game state of the game and other attributes of the game and of the user that initiated (i.e. publisher or initiator) the sharing of the game. The instance of the game also includes one or more controls to access and play the game.

The update manager 112 forwards the instance of the game and the game related information back to the client game interface 108 on the client 102 in a content stream of a social network so that one or more social contacts of the social network selected for sharing can access and play the game. The updated game state presents a current view of the online game for social contacts of the social network.

Figure 2A:
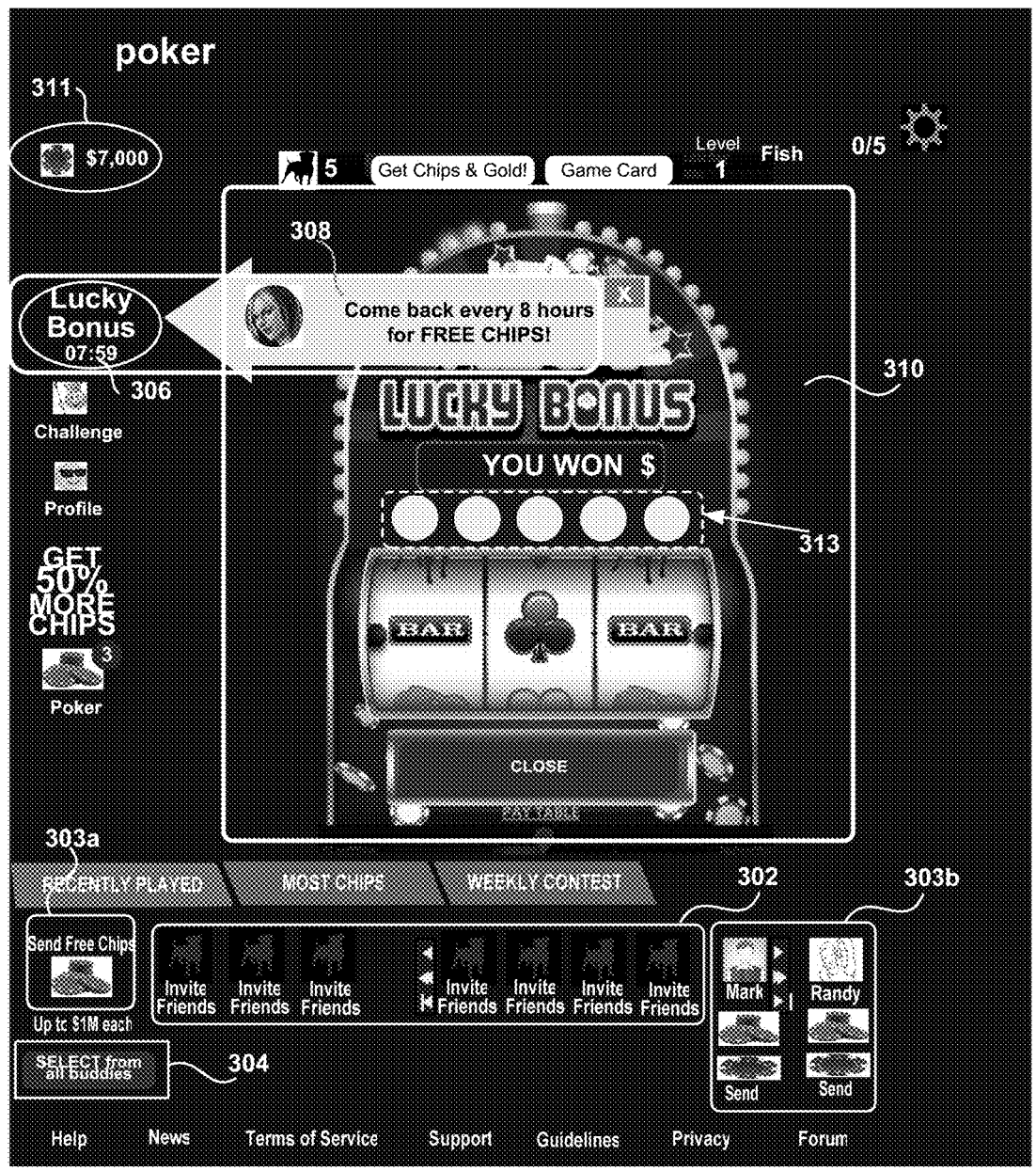

FIG. 2a illustrates a graphical user interface (GUI) representation of the online game interface provided by the access manager at the client for the user to interact and play the game and also includes updates provided by the update manager 112. The updates include the game state 310 and game rewards 311 accrued by the user during game play of the online game. The game state provides a current view of the game including the level of the game being played, number of chances remaining, etc. The game rewards include points accrued, special tools acquired, etc.

Referring to FIGS. 1 and 2a, when the share manager 114 within the game manager 120 receives a request from the user to share the online game with other users in a social network, the share manager 114 generates an instance of the game of the user initiating the sharing request. The instance of the game inherits current state of the play session resulting from the user's interaction at the game, for sharing in a stream of the social network. One or more controls are provided at the online game interface at the client device 102 that are user selectable, for enabling a user to share the game with other users. FIG. 2a illustrates one exemplary 'share' control 304 provided by the access manager that can be selected by the user for sharing the online game with one or more users within one or more social networks of the user. The share control illustrated in FIG. 2a is exemplary and should not be considered restrictive or limiting. Other forms of share control may be provided at the game interface rendered on the client for enabling the user to share the online game with other social contacts within one or more social groups in the social network of the user.

In one embodiment, when the user selects the share control 304, the user is provided with one or more social networks, one or more social groups within one or more social networks and/or one or more social contacts available within one or more social groups of the user to select for sharing an instance of the online game. FIG. 2a illustrates an exemplary view of the social contacts of the user that is provided by the share manager 114. In order to provide this information, the share manager 114 interrogates the user data 122 and social data 124 and retrieves the one or more social groups and one or more social contacts within each of the social groups associated with the user from the social data 124 and returns this information to the client for rendering and user selection at the share control box 304.

When a user selects the social networks and/or social groups of the user, the user is presented with social contacts from the selected social networks and/or social groups in a social-contact-selection-interface 302 for the user to select other users to share the instance of the online game. The user who initiates the sharing of an instance of the online game is the initiator.

In addition to the one or more controls for sharing, the share manager 114 may also provide game incentives 303a in accordance to pre-defined game rules, which the initiator can extend to other users. The initiator can use the game incentives to encourage the other users to play the shared online game. The initiator interacts with the social-contact-selection-interface 302 to identify the social contacts with whom to share the instance of the online game and provide the game incentives to the other users encouraging the other users to play the game. In one embodiment, the initiator may select a subset of the identified social contacts to share the game incentives. In another embodiment, the initiator may select to share the game incentives with all of the identified social contacts with whom he shares the instance of the game. FIG. 2a illustrates the user interface of the instance of the online game rendered at the client device of the initiator identifying the social groups 304 and social contacts 302 from the selected social groups of the initiator for sharing the game.

Figure 2B:
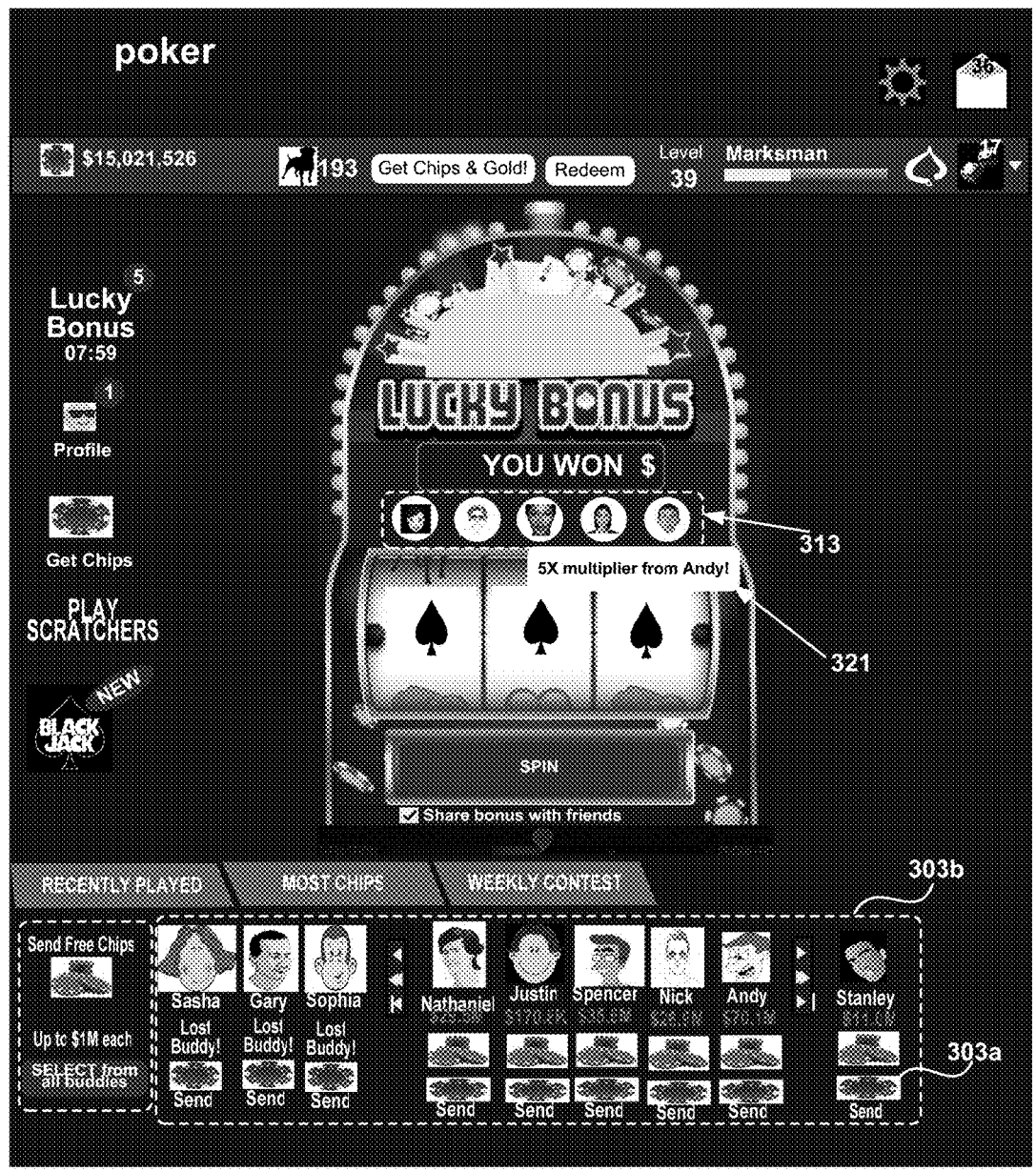

The share manager 114 receives the user selection of one or more social groups, and one or more social contacts within the one or more social groups to share the online game. FIG. 2b illustrates a user interface of the game rendered at the initiator's client device after the initiator has selected the social contacts 303b to share the instance of the game. FIG. 2b also shows the game incentives 303a that the initiator is offering to the selected social contacts to encourage the social contacts to play the instance of the online game.

Continuing to refer to FIGS. 1 and 2a, the share manager 114 receives the selection of the social contacts from the client, retrieves the respective social contact information from the social data, such as transmitting information, etc., retrieves information related to the online game from game data, such as current state, game rewards, and game incentives provided by the user from the user data, social data and from user interface, generates an instance of the game at the time the request was received at the share manager 114 and forwards the retrieved/generated information related to the online game to the selected social contacts in a post to a stream of the social network. In one embodiment, the information related to the online game includes rewards, scores, game level, game tools, game options, available game incentives and game graphics related to the current state of the game. The game state, in one embodiment, is provided in a Shockwave Flash (SWF) file format, which is an interactive application component. The SWF file is a file format that is commonly used in browser games for rendering multimedia, vector graphics, etc. The SWF file can contain animations or applets of varying degrees of interactivity and function. The SWF file is formatted for displaying animated vector graphics on the Internet. The SWF file format is an exemplary format for providing the instance of the game and should not be considered limiting. Other formats may be used to provide the instance of the game.

In one embodiment, the posting of the instance of the online game with current state information is active for a pre-defined life span. In this embodiment, upon expiration of the life span, the post in the stream of the social network with information related to the online game provided to the one or more social contacts is invalidated.

In one embodiment, in addition to the general incentives, a periodic incentive 308 may also be extended to all the social contacts to encourage the social contacts to participate in the online game and contribute toward achieving a goal for the user. In one embodiment, the periodic incentive may be in the form of free points, chips, awards, etc. In one embodiment, the periodic incentive may be extended during the life span the post is active in the stream or once every pre-defined period to encourage the social contacts to take advantage of the periodic incentive offer. FIG. 2a illustrates an exemplary period 306 extended with the periodic incentive offer to the social contacts, in one embodiment. The period 306 illustrated in FIG. 2a is provided as a count-down digital timer. As noted, the period 306 illustrated in FIG. 2a is exemplary and should not be considered limiting. Other forms of providing period 306 may be used.

Referring to FIG. 2a, the user interface of the game rendered for the initiator will not have any social contacts contributing initially. This may be the case as the initiator may not yet have shared the game. As a result, the contributing-user box 313 will be empty, as illustrated in FIG. 2a. When the initiator initiates sharing by posting the instance of the game in the stream of the social network of selected social contacts and the one or more of the selected social contacts play the game in the stream and accept the winning awards, the share manager 114 updates the contributing-user box 313 and provides visible indication of the social contacts that have accessed the online game provided in the stream of the social network and interacted to contribute toward achieving a goal for the user, at the client 102. In one embodiment, the visible indicator is in the form of images of the social contacts that are provided in the contributing-user box 313. Referring now to FIG. 2b, images of the social contacts that have contributed toward achieving the goal for the user are illustrated in a contributing-users box 313 at the initiator's game user interface. The contributing-users box 313 is an aggregate of all the social contacts that have played the online game shared by the user, accepted the rewards/awards (i.e. clicked in the game to accept the award) and each social contact's contribution (in the form of game rewards, for example) toward the initiator's subsequent game play. User interaction, such as mouse over, at each contributor's image in the contributing-users box 313 will display the extent of influence the contributing social contact has on the winnings of the initiator's subsequent game play. For example, as illustrated in FIG. 2b, when the initiator interacts at a social contact's image by 'mousing over' the image, for example, the social contact's contribution to the initiator's subsequent game play is shown in box 321. In the example, the social contact, Andy, contributed to a 5 fold increase in the winnings for the initiator's subsequent game. As a result, during a subsequent game play of the slot game by the initiator, the initiator is awarded 5 times his winnings awarded during the game. In one embodiment, the social contact's contribution, in the form of award multiplier, is active for the current session of the initiator.

In one embodiment, in addition to information related to the game rewards, periodic incentives and game incentives, the share manager may also provide options to provide additional incentives that are different in scope than the aforementioned incentives. The additional incentives may be in the form of tools, levels, etc., while the aforementioned incentives may be in the form of game points. The additional incentives may be provided to selective one or more social contacts for their contribution and/or to encourage them to continue contributing to the online game of the user.

Figures 2, 2C:
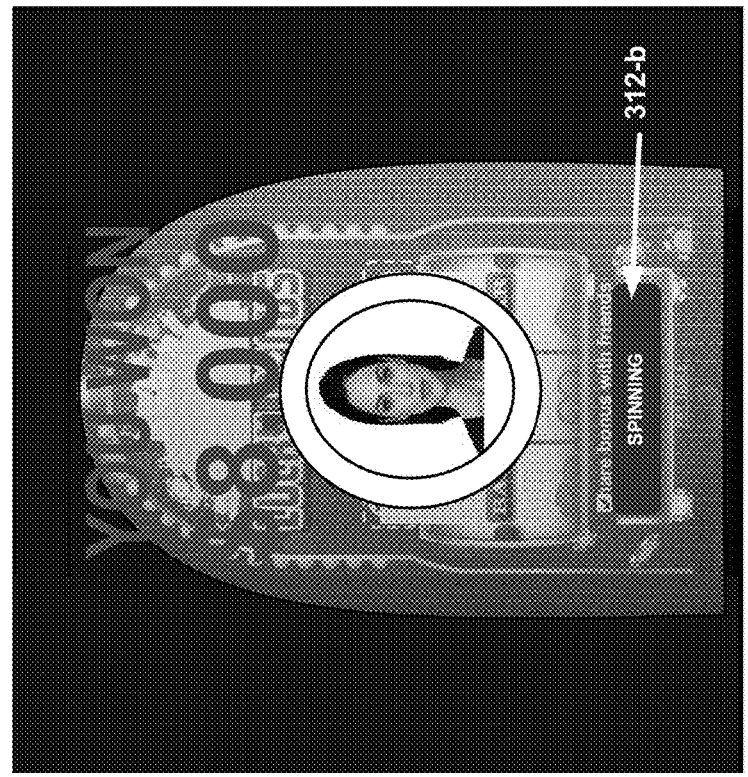
Figures 1, 2C:
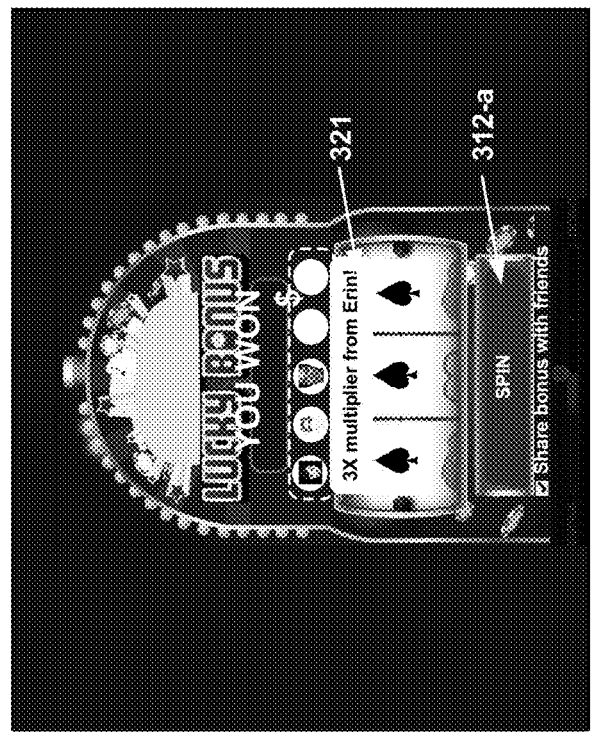

FIGS. 2c-1 and 2c-2 illustrate the user interface of the game played by the initiator after the social contacts have played the online game in the stream and accepted awards. As mentioned earlier, when the initiator plays the game after the social contacts have played the game and accepted the awards, the game winnings for the initiator are increased multiple folds. The number of folds of increase may be based on the number of social contacts that have played the game and accepted the winnings. When more social contacts contribute to the online game, the multiplier applied for the initiator's game winnings increases. For example, if three social contacts contributed to the online game by playing and accepting the awards, the initiator's winnings during subsequent game play may be increased 3 folds. This is illustrated in FIG. 2c-1 in box 321. Similarly, if five social contacts played the online game and accepted the awards, the winnings of the initiator during the initiator's subsequent game play increases 5 folds, as illustrated in box 321 of FIG. 2b, and so on. FIGS. 2c-1 and 2c-2 illustrate the user interface of the game rendered at the initiator's client device when the initiator selects the control 312-a for initiating game play and the updated control 312-b that is rendered in response to user interaction with control 312-a of FIG. 2c-1.

Figure 3:
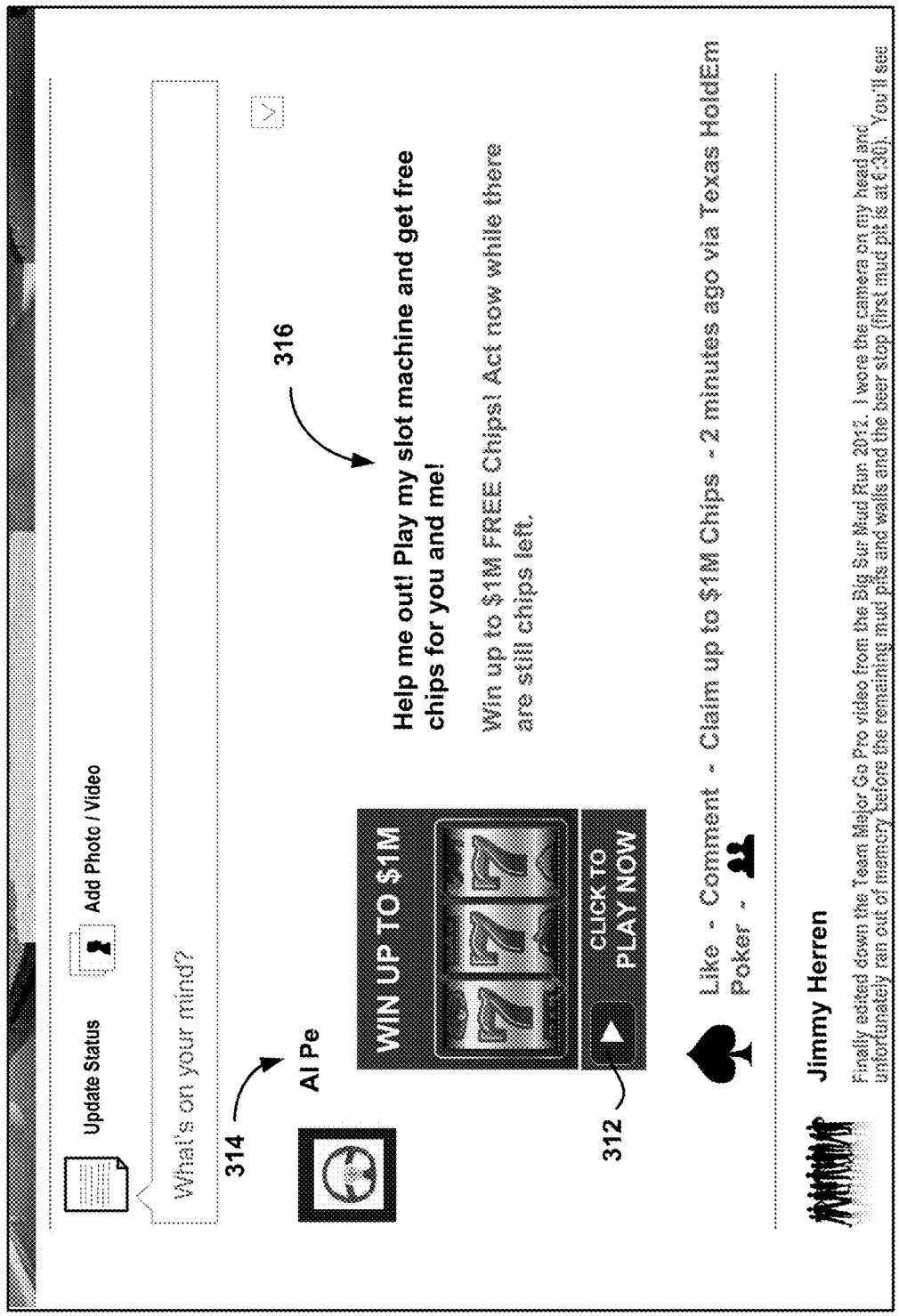
FIG. 3 illustrates a GUI representation of the online game provided to a social contact within a social network, according to one embodiment.

Referring now to FIGS. 1 and 3, the content stream with the information related to the online game is presented to a social contact when the social contact accesses his/her stream in the social network. FIG. 3 illustrates an exemplary GUI representation of the posting 316 with an instance of the game and the information related to the online game provided in a content stream 314, by the share manager 114 at the social contact's social network, in response to a request for sharing the online game received from the user. The information related to the online game includes a game state of the online game of the user and one or more controls 312 to access and participate in the online game from within the social network.

Figure 4A:
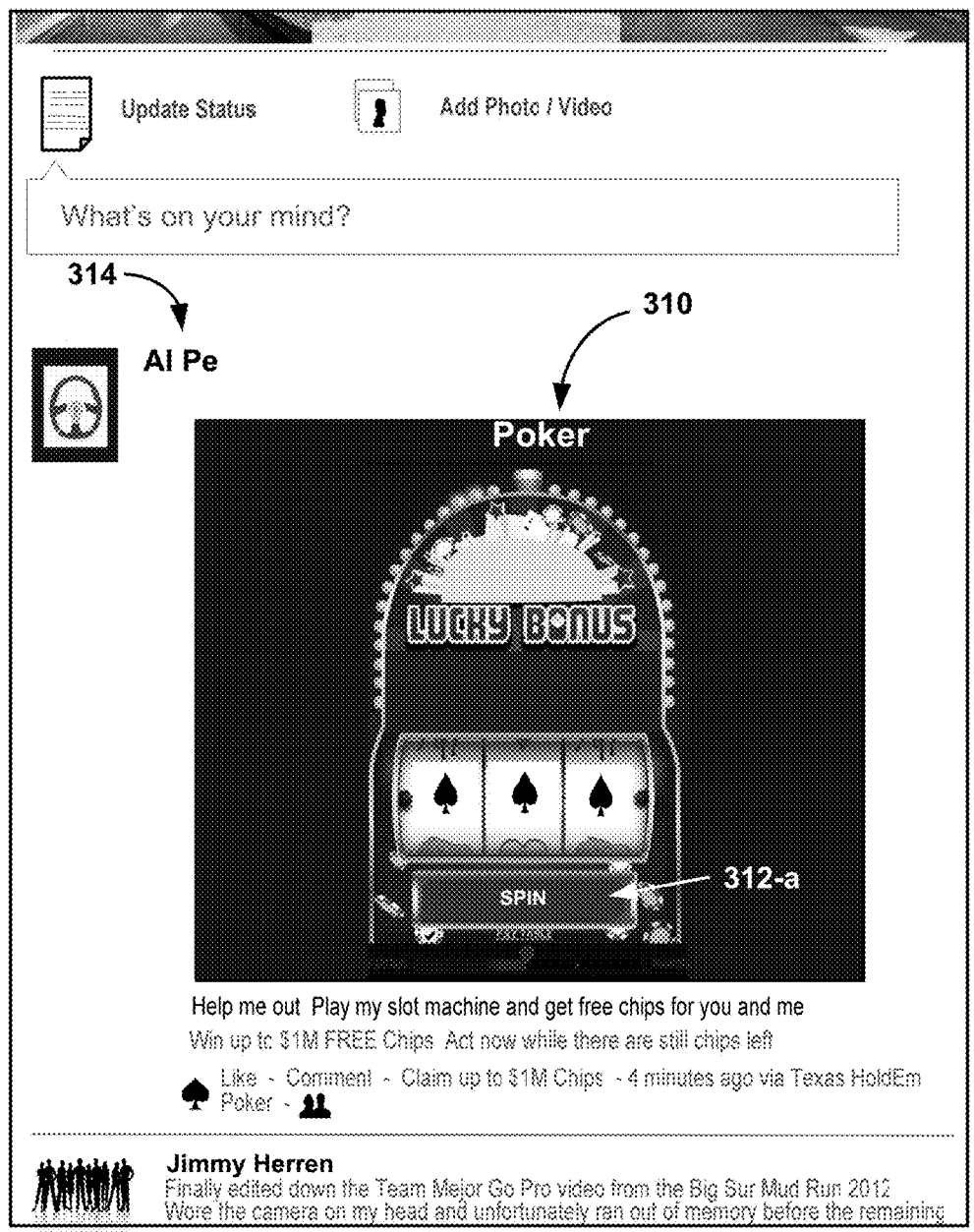
FIGS. 4a-4b illustrate the controls provided to other users for interacting with the online game within the social network stream, according to one embodiment.
Figure 4B:
Figure 4B:
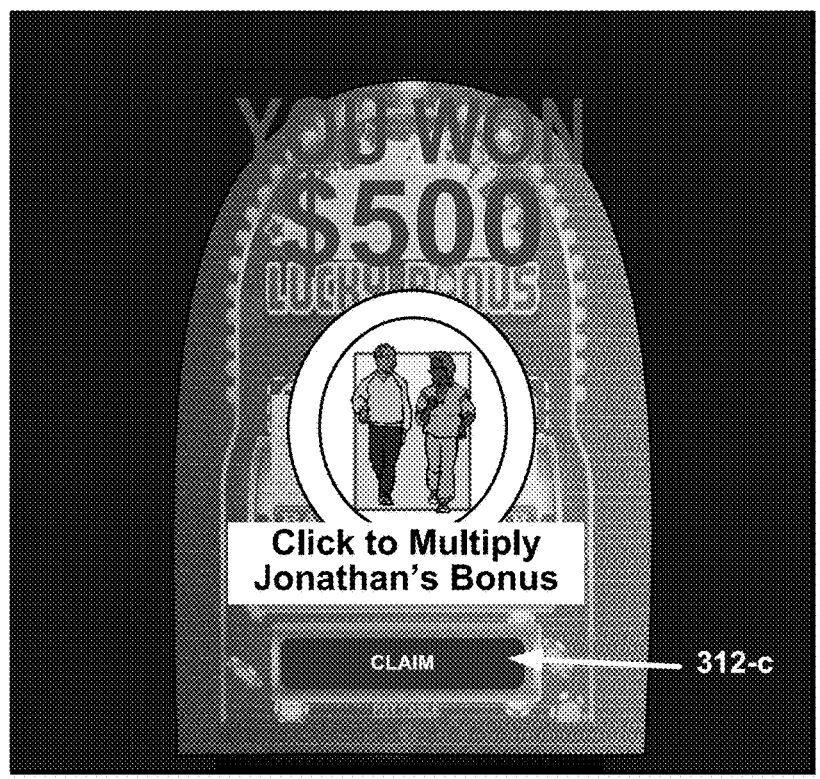
Figure 4B:

Referring to FIGS. 1, 3 and 4a, when the social contact accesses the online game from within the social network stream and plays the game using the control 312, the interactive component of the online game allows expansion of the online game interface within the content stream in the social network so as to allow the social contacts to interact and participate in the online game in the stream without leaving the social network. The expanded online game rendered in the social network of the social contact is an actual instance of the initiator's online game capturing the current state of the game including game state, image, score, etc., from the initiator's client 102 at a time when the initiator decided to share the online game with the one or more social contacts. In addition to the game state, one or more controls are provided for the social contact to participate in the online game within the social network. FIG. 4a illustrates an exemplary GUI representation of the online game provided in the stream of the social network of a social contact. As illustrated, the content stream 314 of the social network for the social contact includes the game interface with the game state and controls for playing the online game from within the social network. When the online game controls are accessed through the access control 312 of FIG. 3, an expanded version of the online game interface 310 is provided along with an interaction control 312-a to enable a social contact to interact with the online game and contribute to the online game of the user. When the user completes playing the game or after playing for a period of time, the social contact may decide to claim his rewards. FIG. 4b illustrates the interaction control 312-c that allows the social contact to claim his rewards. The social contact may use the interaction control 312-c to "click into" the game to claim the rewards. The "click into" option is implemented as a "claim" button 312-c. When the social contact claims his awards, the user data and the game data for the social contact is updated with the social contact's winnings.

Referring back to FIG. 1, the distribution manager 116 keeps track of the interactions at the online game from within the stream of the social network by the various social contacts with whom the initiating user has shared the online game. In one embodiment, when the social contact claims his awards, the distribution manager 116 then interacts with the update manager 112 to determine the game state and game rewards to be awarded to the social contact based on the social contact's interactions at the online game interface in the social network. The game state and game rewards, as explained earlier, are determined by the game mechanics logic within the update manager 112. The distribution manager 116 distributes the game rewards to the respective social contact in response to the social contact's selection of the claim button and awards an equivalent game multiplier to the initiator. In one embodiment, the distribution manager uses a pre-defined distribution algorithm to determine proportion of allocation of the game rewards to the social contact's based on the social contact's game play and the magnitude of game multiplier to be awarded for the initiator. In one embodiment, the game reward allocation may depend on attributes associated with the online game and the attributes associated with the social contact playing the online game. For instance, some of the attributes of the online game for the game reward allocation may include skill level of the online game played, number of challenges met, type and quantity of game rewards awarded, etc., and some of the attributes of the social contact may include amount of time spent interacting at the online game, skill level of the social contact, reliability of the social contact, etc. In one embodiment, game reward awarded to the initiator from each of the social contacts participation is received and aggregated and the aggregated game reward is used to determine the multiplier to be awarded to the initiator. The update manager updates the game rewards to the respective social contact's account within the game data and/or user data upon the social contact's acceptance of the reward and the game multiplier is updated to the initiator's account within the game data. In one embodiment, the aggregation and updating of the game rewards to the user accounts within the game data for the social contacts and the initiator is done periodically. The distribution manager also updates the game state of the online game for the initiator by aggregating the game states of all the social contacts and using the aggregated game state to update the game state of the initiator so that the initiator is presented with the most up-to-date view of the online game. This includes updating the game state, image, game rewards, etc. In one embodiment, the updates to the user accounts of the social contacts and the initiator are performed only upon the social contacts clicking into the game and accepting the game rewards. The game state of the online game for the initiator is saved in the game data and retrieved when the initiator next initiates online game play.

Figure 5:
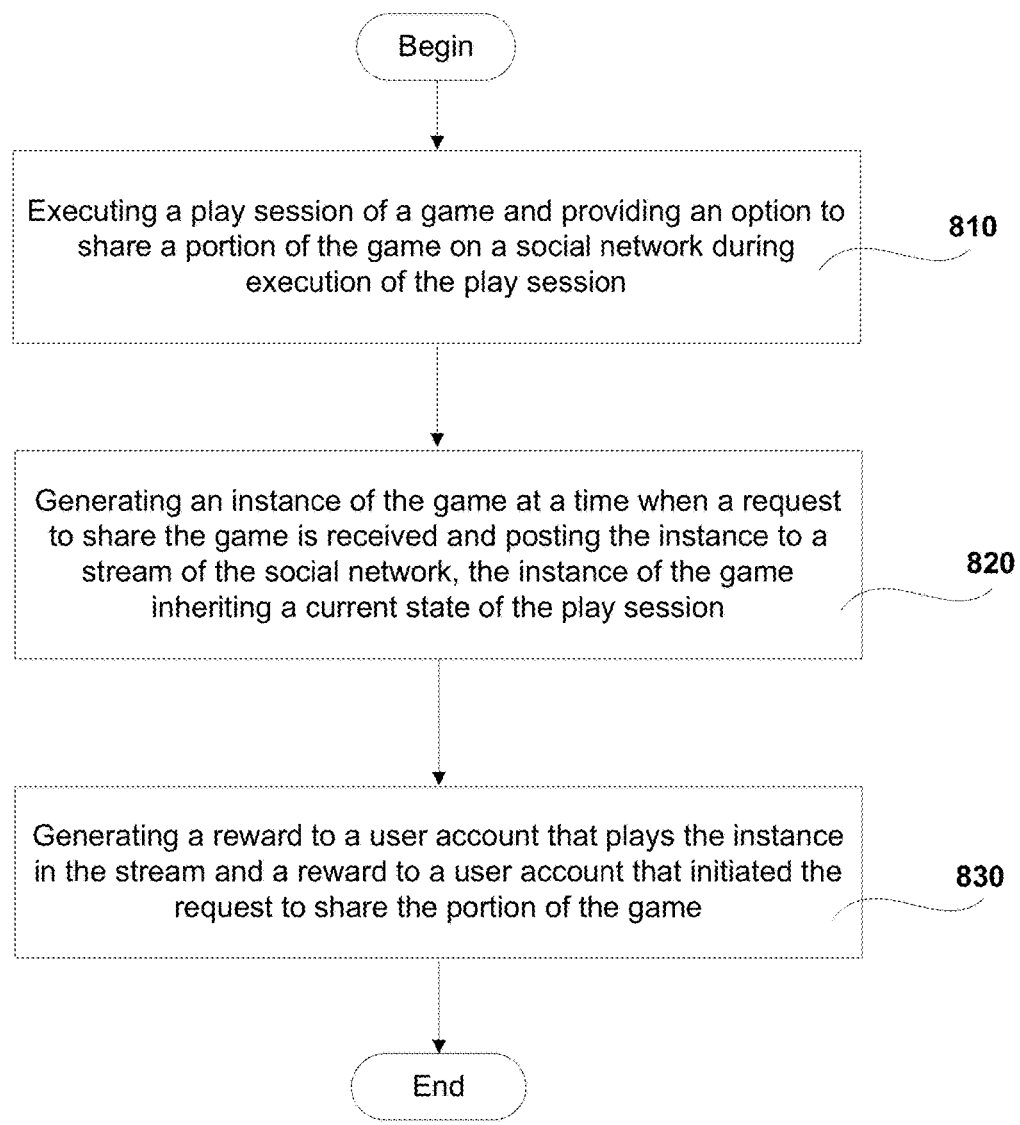
FIG. 5 illustrates a flowchart of operations for allowing interactive post of an online game within a social network, in accordance with one embodiment.

With the general understanding of the various modules of the system, methods for managing rewards in online games will now be described with reference to FIGS. 5 and 6. FIG. 5 illustrates method operations for sharing online game play over a social network, in one embodiment of the invention. The method begins at operation 810, wherein a play session of the online game is established on a server. The server, such as a game server, provides access to the online game executing on the server and allows the user to interact with the game during a play session. The access may be provided through a game portal or from within a social network available to the user. The access may be provided as a link within the social network. During the play session, the user interaction at the online game are tracked and information related to play session of the online game by the user are received and updated to appropriate user and game data maintained by a game manager executing on the server. The information related to the online game play affects the game state and the game rewards awarded to the user. The game manager may engage game mechanics logic to evaluate the game play in order to determine game state and the game rewards. In online games, such as slot machine games, the game state may be a result of random probability.

During the engagement of the user in the online game, the game manager may receive a request from the user for sharing a portion of the online game with one or more social contacts within one or more social groups of the social network, as illustrated in operation 820. The user initiating the request is the initiator or publisher.

In response to the request, the game manager captures the game state of the online game of the user at the time the request to share was initiated by the user and generates an instance of the game. The instance of the game inherits the captured game state of the online game of the play session of the user. The game state includes the status, image, game rewards (i.e. game score), etc of the online game of the user. The game manager then posts the instance of game along with one or more controls to a stream of the social network of selected ones of the social contacts. The controls provided with the instance of the game allow the social contacts to access and participate in the online game from within the stream of the social network. In one embodiment, the game manager retrieves online contact information (i.e. information used for transmitting the online game state) of the selected ones of the social contacts and uses the contact information to post the instance of the game in a stream of the social network that is accessible to the respective social contacts. The social contacts, in turn, access the instance of the game in the stream of the social network, participate and contribute to the online game of the user from within the social network using the provided controls and accept the awards. The participation of the social contacts in the game affects the game state and generates game rewards for the social contacts to claim. When the social contacts claim the awards, the game rewards are credited to the user account of the social contacts and the game rewards are used to compute a game multiplier for the user, as illustrated in operation 830. The game multiplier is updated to the user's account and is used in computing the winnings of the user when the user subsequently accesses and plays the online game.

Figure 6:
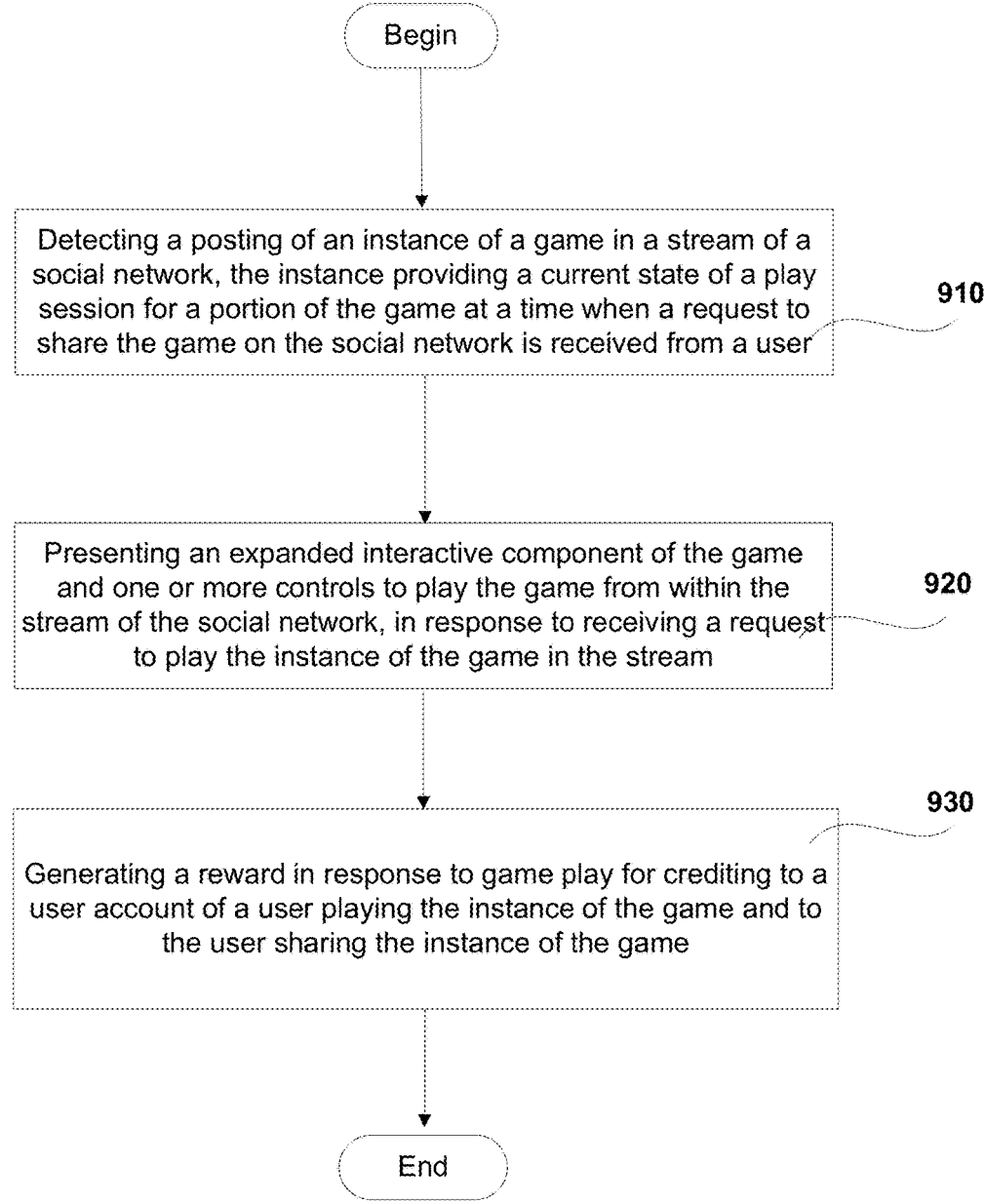
FIG. 6 illustrates a flowchart of operations for allowing interactive post of an online game within a social network, in accordance with an alternate embodiment.

FIG. 6 illustrates an alternate embodiment of a method for sharing game play over of an online game over a social network. The method begins at operation 910 wherein a posting of an instance of a game in a stream of a social network, is detected. The instance of the game captures a current state of a play session for a portion of the game of a user at a time the user generates a request to share the game on the social network and also includes one or more controls to play the game. In response to the detection, a social contact associated with the stream may initiate a game play request by accessing the one or more controls. In response to the social contact's interaction at the controls of the game in the stream, an expanded interactive component of the game and one or more additional controls to play the game from within the stream is presented, as illustrated in operation 920. As mentioned earlier, in one embodiment, the instance of the game depicting the current state and the controls for interacting with the instance are provided as a SWF file that allows expansion of the online game within the stream of the social network enabling the social contacts to interact with the online game without having to leave the confines of the social network. When the social contact interacts with the controls of the online game from within the social network post, the information related to game play resulting from participation of the social contact in the online game is captured and is used to determine the game state and to generate game rewards for crediting to a user account of the social contact, as illustrated in operation 930.

The game manager monitors the interaction of the social contact at the online game interface within the stream in the social network and uses the game mechanics logic within to determine the game rewards to be awarded and the game state of the online game based on the game play. When the social contact clicks into the game by interacting with a claim option, the game manager identifies the share of the game rewards that are to be awarded to the social contact playing the instance of the game from within the social network and a game multiplier for the user initiating the sharing based on a pre-defined distribution algorithm and updates the user and the social contact's accounts with the respective share of game multiplier/game rewards. The game rewards generated to the social contact may include incentives that are extended to the social contact for participating in the online game. The game manager also updates the game state of the online game of the user initiating the sharing to reflect a current view of the online game. When more than one social contact responds to the request to participate in the online game and accepts by claiming the game rewards, the game manager aggregates the game rewards of the social contacts and computes the game multiplier for the user initiating the sharing using the aggregated game rewards and updates the user's account in the game data with the game multiplier. The game multiplier is used in determining the user's winnings when the user subsequently accesses and plays the game. It is understood that not all the social contacts that received the invitation may participate in the online game or participate at the same time. In recognition of this fact, the game manager monitors each social contact's interaction and participation in the online game in an ongoing manner and periodically performs the aggregation based on the rewards generated due to the one or more social contacts' participation during that period and dynamically updates the appropriate share of the game rewards to the respective social contact's game account and the multiplier to the user's account.

It should be noted that the various embodiments described herein, the instance of the game based on a user's desire to share a portion of the online game over the social network is generated at the game server executing the game play and is distributed to the social network server through the respective posts in the respective streams of the one or more social networks. It is also noted that the reward to a user account is generated in response to the social contacts interaction at the social network server that is executing the instance of the online game shared by the user in the stream and credited to the respective user's accounts in response to the social contacts clicking into the game and claiming the awards. The game reward and game multiplier is computed by a game mechanics logic or processing logic contained in the instance of the game executing on the social network server and updated to respective databases (i.e., user data, game data, etc.) available to the game server executing the play session of the user initiating the share request.

The various embodiments of the invention identify an interactive online game that can be accessed and played directly from a stream of a social network and the users need not have to leave the social network page. The online game interface provided to the social contacts is an actual instance of the online game of a user and is not a link that would direct the social contact to a different page for playing the online game. When the social contact desires to play the game, the access controls allow expansion of the online game interface in the stream of the social network and the interaction controls provided in the instance of the game enables the social contact to participate in the online game of the user and claim game awards without leaving the stream or the social network. When the social contact is done playing the game, the social contact can continue browsing the content streams within the news feed in the social network, making this a robust and efficient way for collaborating with other users to achieve a desired goal in the online game.

Figure 7:
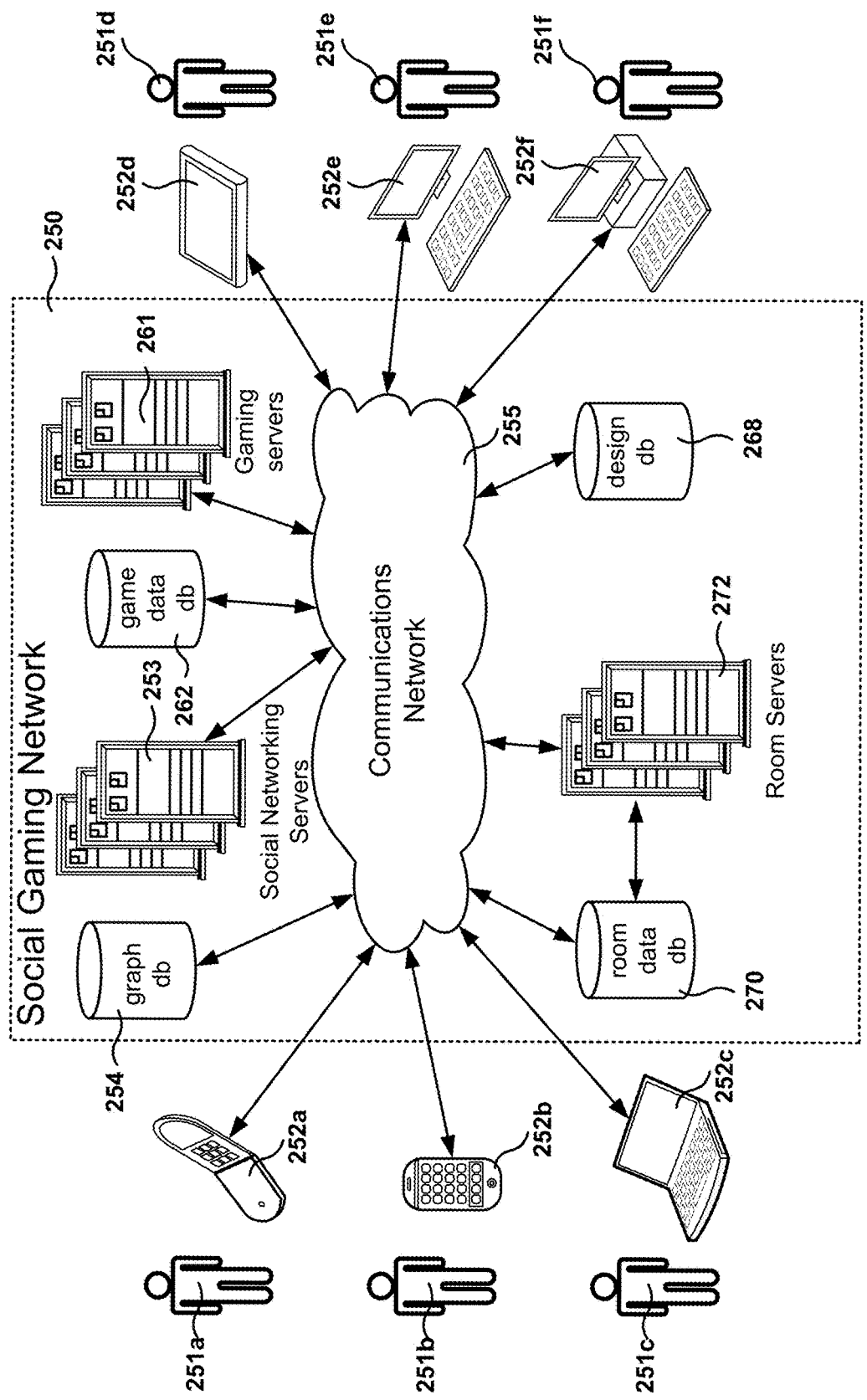
FIG. 7 shows a block diagram illustrating a social-gaming network architecture, according to one embodiment.

FIG. 7 shows a block diagram illustrating exemplary social-gaming network architecture, according to one embodiment. In some implementations, a plurality of players (e.g., 251a-251f) may be utilizing a social gaming network 250. Each player interacts with the social gaming network via one or more client devices (e.g., client devices 252a-252f). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Room Servers 272 manage the slot rooms system in the game, including the creation, tracking, expiration, abandonment, and deletion of rooms. In addition, a room database 270 holds room information, and design db 268 holds information data.

Figure 8:
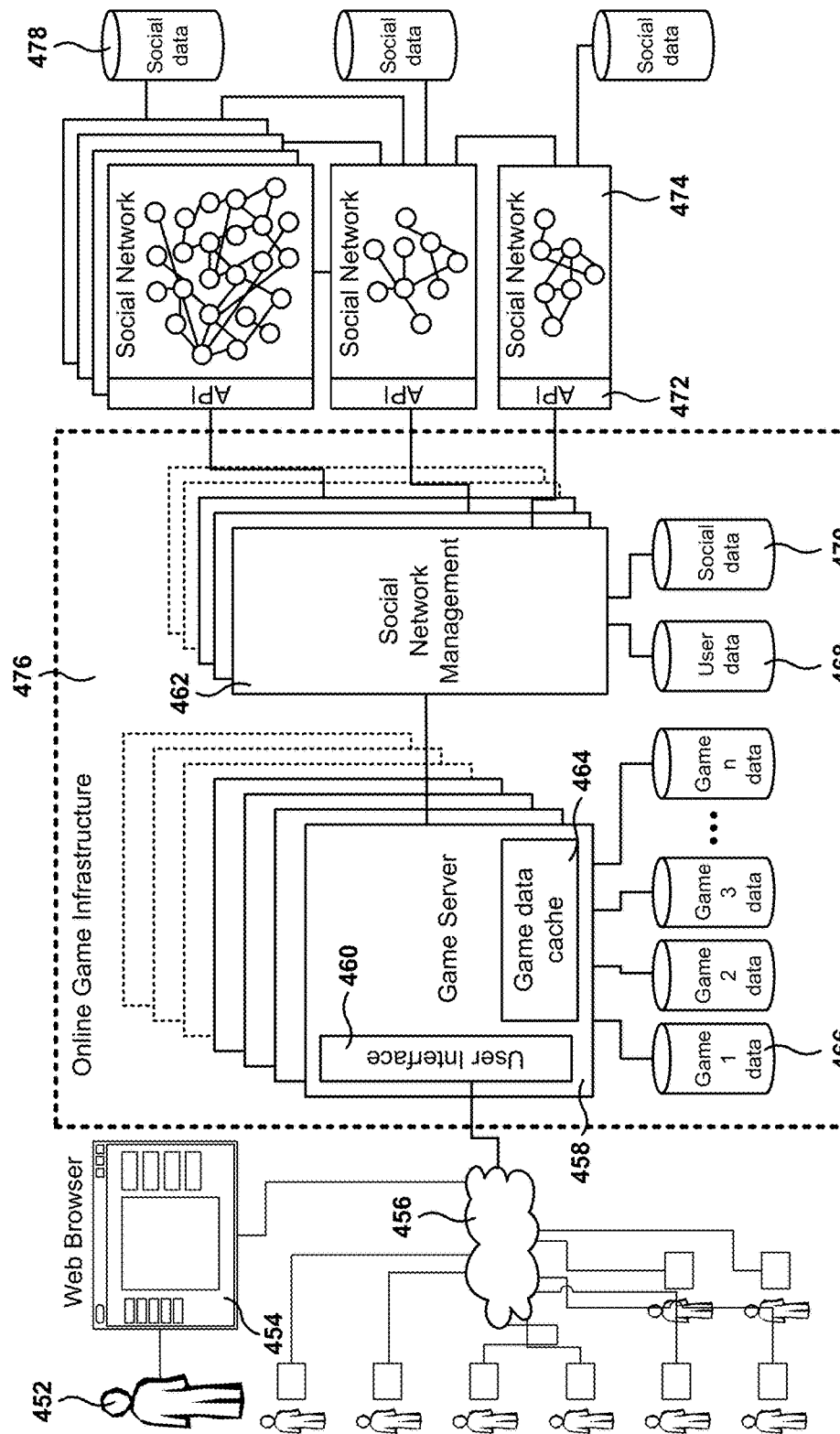
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook®, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

Figure 9:
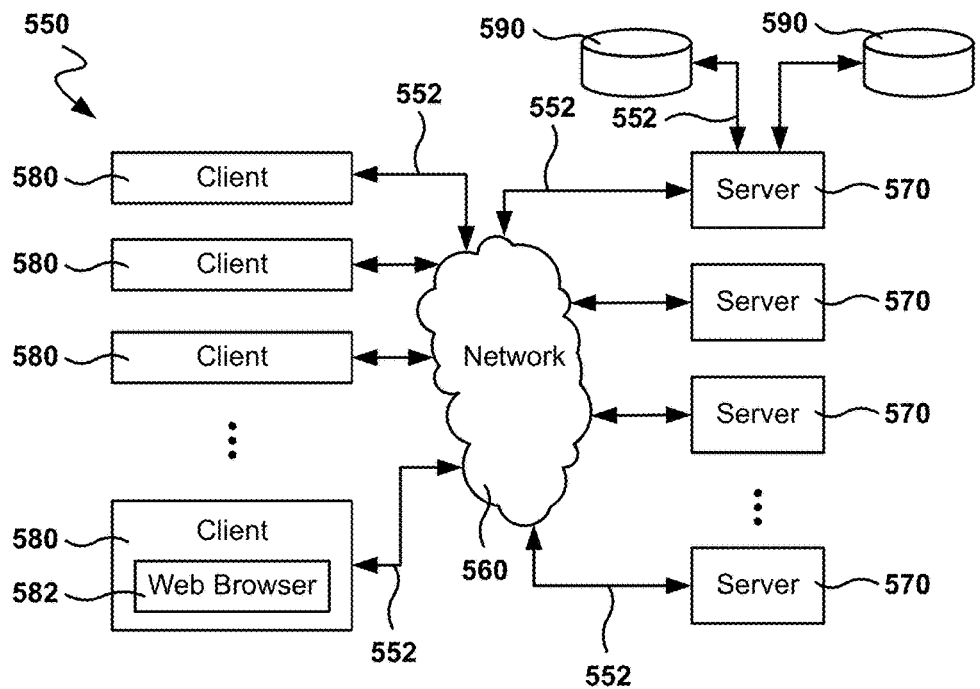
FIG. 9 illustrates an example network environment suitable for implementing embodiments.

It is noted that the embodiment illustrated in FIG. 9 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 9 should therefore not be interpreted to be exclusive or limiting, but rather exemplary or illustrative.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, slots server, jackpot server, gambling server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more servers 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
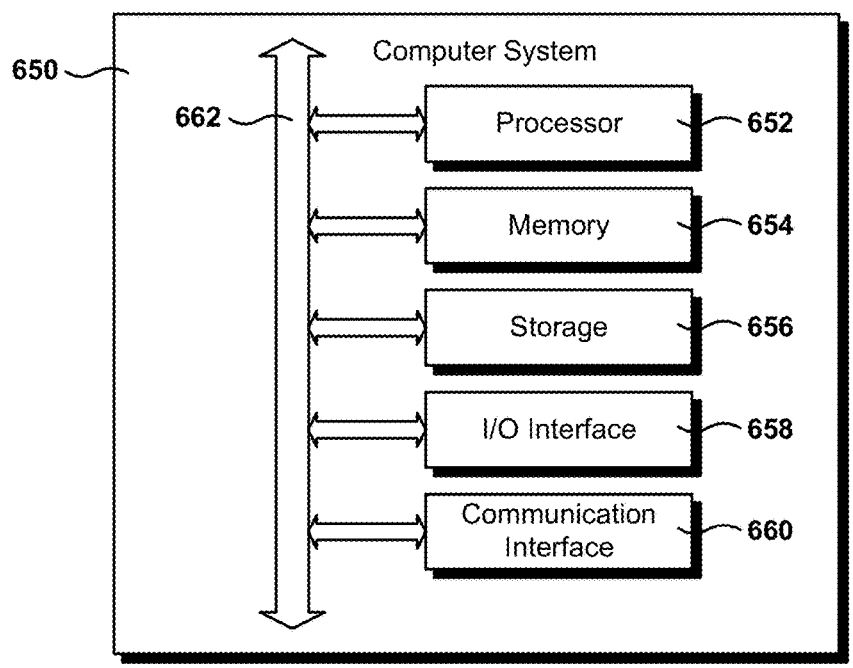
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnects.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for sharing game play over a social network, comprising:
   executing a play session of a game by a game server, during execution of the play session providing an option to share a portion of the game for game play on the social network;
   in response to receiving a request to share the portion of the game, generating an instance of the game at a time when the request is received, the instance of the game inheriting a current state of the play session and including game controls for allowing interaction related to game play for the portion of the game from within a stream of the social network, and posting the instance of the game to the stream of the social network of one or more social contacts of a user initiating the request, wherein posting the instance of the game includes providing an expandable interactive application component of the game, wherein the one or more social contacts of the user are obtained from the social network in response to an application programming interface call made by the game server;
   computing a reward for each of the social contacts that plays the instance of the game from within the stream of the social network, and a game multiplier for rewarding the user that initiated the request, upon respective one of the social contacts playing the instance of the game claiming the reward, wherein the reward and the game multiplier are computed by,
      evaluating interactions provided by the social contacts during the playing of the instance of the game within the social network to determine a game state of the game, the game state used in computing the reward and the game multiplier; and
   dynamically updating the reward generated by the update manager to a user account of each of the social contacts that played the instance of the game and the game multiplier to the user account of the user,
   wherein operations of the method are executed by a game manager running on a processor of the game server.

2. The method of claim 1, wherein the generating of the instance of the game is performed on the game server executing the play session of the game and distributed to the social network server through the post.

3. The method of claim 1, wherein the generating of the reward to a user account is performed on the social network server executing the instance of the game in the stream, the reward computed using processing logic contained in the instance of the game executing on the social network server and updated to the game server.

4. The method of claim 1, wherein inheriting a current state includes inheriting one or more game attributes of the play session of the game including one or more of a game score, a game level, game tools, rewards, game options, available game incentives and game graphics related to the current state of the game.

5. The method of claim 1, wherein the posting of the instance of the game in the stream is active for a predefined life span.

6. The method of claim 5, wherein upon expiration of the predefined life span, invalidating the instance of the game in the stream of the social network.

7. The method of claim 1, wherein generating the reward to the user account that initiated the request further includes,
   aggregating the rewards awarded to the one or more social contacts that play the instance of the game from within the social network; and
   computing the game multiplier for the user that initiated the request as a function of the reward awarded to the social contacts, the game multiplier used in determining rewards for the user initiating the request during the initiating user's subsequent play of the game.

8. The method of claim 1, wherein generating a reward further includes,
   providing a visual indicator at the play session of the game for the user initiating the request, the visual indicator identifying the social contact playing the instance in the stream and the rewards credited to the user account of the user initiating the request and the social contact playing the instance in the stream, wherein the visual indicator is provided by the share manager.

9. The method of claim 1, further includes presenting game related incentives periodically to the social contacts to encourage participation in the game play of the portion of the game shared by the user.

10. The method of claim 1, wherein generating the reward and the game multiplier further includes,
   interpreting, by the update manager, user interaction detected in the portion of the game from the social contact playing with the instance of the game from within the social network; and performing game simulation to determine outcome of the game, the outcome from the game simulation used in determining the reward and the game multiplier.

11. A method for sharing game play over a social network, comprising:

detecting a posting of an instance of a game in a stream of one or more social contacts within the social network of a user, by a share manager within a game manager executing on at least one processor of at least one computing device, the instance of the game providing a current state of a play session for a portion of the game at a time when a request to share the game on the social network is received from the user and including controls for allowing interaction related to game play, the posting of the instance includes an expandable interactive component of the game, wherein the one or more social contacts of the user are obtained from the social network in response to an application programming interface call made by the computing device;

in response to receiving a request to play the instance of the game in the stream from a user, activating the expandable interactive component of the game so as to provide an expanded online game interface within the stream, and one or more controls to play the game from within the stream of the social network by the game manager; and generating, by an update manager within the game manager, a reward for a social contact that plays the instance of the game and a game multiplier for the user sharing the instance of the game in response to game play by the social contact within the social network, the generating includes evaluating input provided by the social contact during game play to determine a game state of the game, and using the game state to determine the reward for the social contact and the game multiplier for the user;

dynamically updating, by a distribution manager within the game manager, the reward generated by the update manager to a user account of the social contact that played the instance of the game and the game multiplier generated by the update manager to the user account of the user that shared the instance of the game in the stream of the social network, wherein operations of the method are executed by a processor.

12. The method of claim 11, wherein the post is active in the stream of the social network for a pre-defined life span and is automatically invalidated in the stream after expiration of the pre-defined life span.

13. The method of claim 11, wherein updating a reward further includes updating a visual indicator at a user interface rendering the play session of the game for the user that shared the instance of the game, the visual indicator identifying the user that played the instance in the stream and the reward credited to the user account of the user playing the instance in the stream, wherein the visual indicator is provided by a share manager of the game manager.

14. The method of claim 11, wherein distributing the reward to the user account that shared the instance further includes, aggregating the rewards of the one or more users that played the instance of the game in response to the user claiming the rewards; and computing the game multiplier for the user that initiated the sharing of the instance as a function of the reward provided to the one or more users, the game multiplier used in determining rewards for the user that initiated the sharing when the user initiating the sharing subsequently accesses and plays the game.

15. The method of claim 11, wherein providing the current state further includes providing one or more game attributes of the play session of the game including one or more of a game score, a game level, game tools, rewards, game options, available game incentives and game graphics related to the current state of the game.

16. A non-transitory computer-readable storage medium embedding program instructions which when executed on a processor of a computer performs a method for sharing game play over a social network, the computer-readable storage medium comprising:

program instructions for executing a play session of a game, during execution of the play session providing an option to share a portion of the game on the social network;

program instructions for receiving a request to share the portion of the game, the program instructions for receiving is further configured to, in response to receiving the request, generating an instance of the game at a time when the request is received, the instance of the game inheriting a current state of the play session and including game controls for allowing interaction related to game play for the portion of the game from within a stream of the social network, and posting the instance of the game to the stream of the social network of one or more social contacts of a user initiating the request, wherein posting the instance of the game includes providing an expandable interactive application component of the game, wherein the program instructions for receiving further includes program instructions for making an application programming interface call to obtain the one or more social contacts of the user from the social network;

program instructions for generating a reward for each of the social contacts that plays the instance of the game from within the stream of the social network and a game multiplier for rewarding the user that initiated the request, upon each one of the social contacts playing the instance of the game claiming the reward, wherein program instructions for generating the reward for each social contact and the game multiplier for the user include program instructions for evaluating interactions provided by the social contact during the playing of the instance of the game within the social network to determine a game state of the game, and program instructions for computing the reward and the game multiplier based on the game state; and program instructions for dynamically updating the reward to a user account of each of the social contacts that played the instance of the game and updating the game multiplier to the user account of the user initiating the request.

17. The computer-readable storage medium of claim 16, wherein the program instructions for generating an instance of the game further includes program instructions to inherit one or more game attributes of the play session of the game including one or more of a game score, a game level, game tools, rewards, game options, available game incentives and game graphics related to the current state of the game.

18. The computer-readable storage medium of claim 16, wherein the program instructions for generating a reward further includes program instructions for providing a visual indicator at the play session of the game for the user initiating the request, the visual indicator identifying the social contact playing the instance in the stream and the rewards credited to the user account of the user initiating the request and the social contact playing the instance in the stream.

* * * * *